W. C. BOHNE.
TIRE APPLYING AND REMOVING DEVICE.
APPLICATION FILED JULY 25, 1917.
1,320,829.
Patented Nov. 4, 1919.
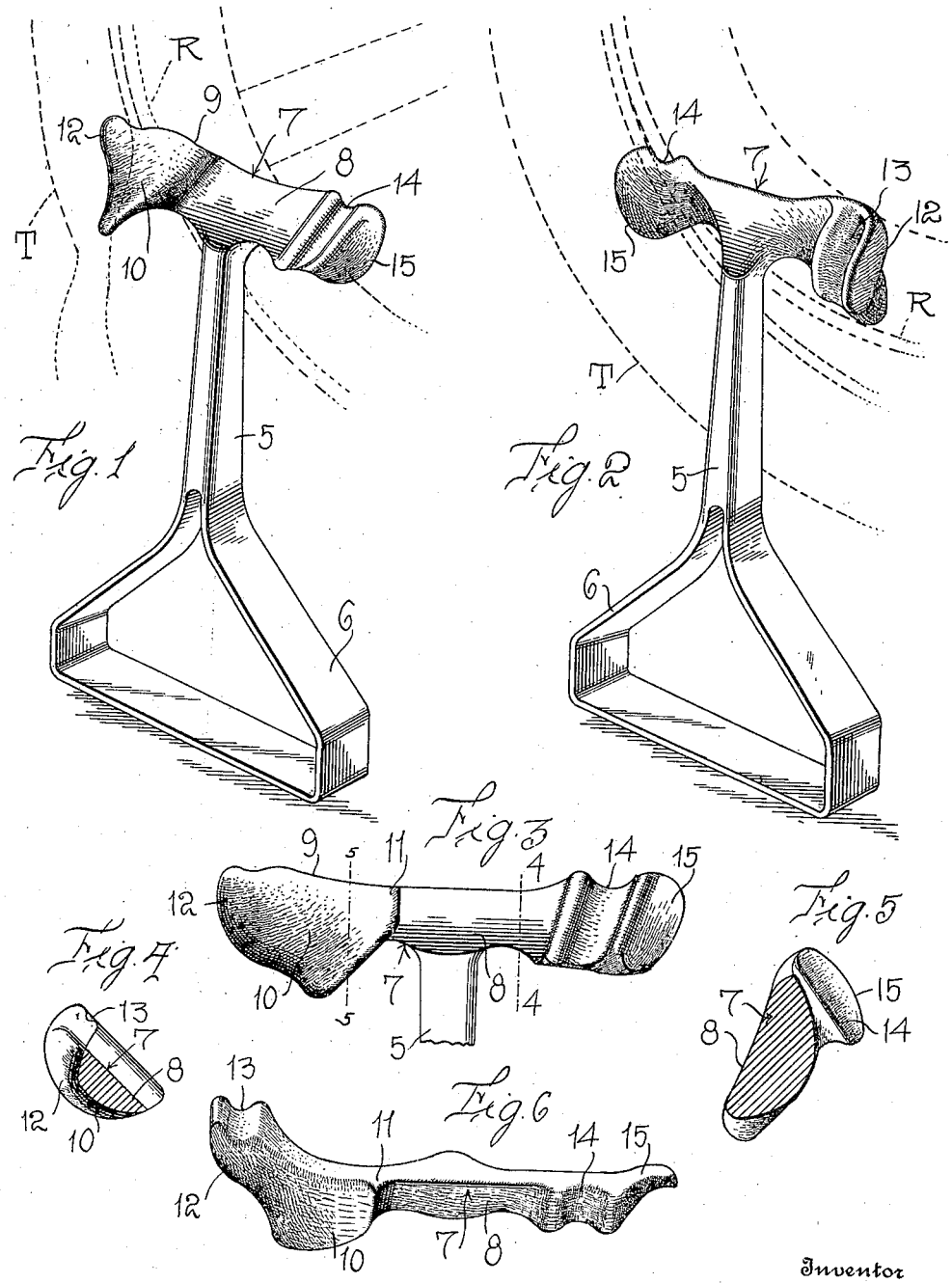
Inventor
WILLIAM C. BOHNE
By Watson E. Coleman
Attorney

UNITED STATES PATENT OFFICE.

WILLIAM C. BOHNE, OF PHILADELPHIA, PENNSYLVANIA.

TIRE APPLYING AND REMOVING DEVICE.

1,320,829. Specification of Letters Patent. Patented Nov. 4, 1919.

Application filed July 25, 1917. Serial No. 182,735.

*To all whom it may concern:*

Be it known that I, WILLIAM C. BOHNE, a citizen of the United States, residing at Philadelphia, in the county of Philadelphia and State of Pennsylvania, have invented certain new and useful Improvements in Tire Applying and Removing Devices, of which the following is a specification, reference being had to the accompanying drawings.

This invention relates to an improved tire applying and removing device, and has for its primary object to provide an article which may be cheaply manufactured in the form of a one-piece casting, whereby an automobile tire may be applied to the wheel rim or removed therefrom with ease and facility and with a minimum of manual labor.

It is another and more particular object of the invention to provide a device for the above purpose having a standard, and a T or horizontal head on the upper end thereof, said head being provided upon one end with means for directing the bead of the tire casing to its seat upon the wheel rim and upon its other end with means for urging the tire casing outwardly from the wheel rim.

It is also another object of the invention to provide an article for the above purpose, which may be very easily and quickly arranged in proper position with respect to the wheel rim and the tire casing and which is so constructed that possible injury to the tire or the rim in applying or removing the former is obviated.

It is also a further general object of the invention to provide a tire applying and removing device which may be very cheaply manufactured and sold, is exceedingly strong and durable, and can be conveniently stored in a relatively small space in the vehicle body.

With the above and other objects in view, my invention consists in the novel features of construction, combination, and arrangement of parts to be hereinafter more fully described, claimed, and illustrated in the accompanying drawing, in which, Figure 1 is a perspective view illustrating the application of the invention for the purpose of seating the tire upon the wheel rim;

Fig. 2 is a similar view showing the device applied for the purpose of removing the tire from the rim;

Fig. 3 is an enlarged side elevation of the operating head of the tool;

Fig. 4 is a section taken on the line 4—4 of Fig. 3;

Fig. 5 is a section taken on the line 5—5 of Fig. 3; and

Fig. 6 is a plan view.

Referring in detail to the drawing, 5 designates the shank of the tool, upon one end of which a foot receiving stirrup 6 of suitable form and dimensions, is formed.

Upon the upper end of the shank 5, the operating head generally designated as 7, is integrally formed. This head extends horizontally or at right angles to the axis of the shank 5 and the central portion thereof is provided with an obliquely inclined face 8. Upon one end of this head, a relatively broad extension 9 is formed having a curved face 10. This end of the head next adjacent to the shank 5, is relatively thick as shown at 11, to provide a portion projecting transversely upon one side of said head. The tire engaging face 10 of this projection on the head gradually merges into the corresponding face of the transversely curved, obliquely disposed extremity 12 of the head. In one side of this oblique extremity of the tool head, a channel or groove 13 is formed which is adapted for engagement upon the bead or flange on the tire rim indicated at R.

The opposite end of the head 7 is also obliquely inclined but in a reverse direction to the end 12 of the head and in substantially parallel relation to the inclined face 8. This latter end portion of the head is likewise formed with a channel or groove 14 on the reverse side of the head with respect to the groove 13, and the extremity of the head at this end is transversely curved in a direction away from the groove 14, as indicated at 15, the other side face of the head being convexly curved.

As shown in Fig. 1 of the drawing, in applying the tire T to the wheel rim, the bead on one edge of the tire casing is engaged with the inner rim flange, the wheel of course, having been properly jacked up. The tool is then arranged in position and the other rim flange seated in the groove 13, this extremity of the head extending under the outer bead of the tire casing which rests upon the concave face 10. The operator places his foot in the stirrup 6 to securely hold the device in place, the other end of the tool head being grasped and the thumb placed against the inclined face 8 so as to assist in holding the tool head in proper relation to the wheel rim. The wheel is then turned in a direction toward the tool and, as the rim flange moves through the groove 13, the edge of the tire casing rides over the curved face 10 and is directed by the transversely curved extremity of the head inwardly to its seat against the inner side of the rim flange. Thus, it will be seen that the tire in this manner can be very easily and quickly applied to the rim and with comparatively little manual exertion.

In removing the tire from the wheel rim, the opposite extremity 15 of the tool head is forced under the outer edge of the wheel tire until the flange of the rim engages in the groove or channel 14. The extremity 15 of the tool head will extend in an outward direction against the inner side of the tire casing and, upon now turning the wheel toward the tool, it will be apparent that the beaded edge of the casing will ride over the convex end face of the tool head and be urged thereby from its seat outwardly beyond the flange of the wheel rim.

From the foregoing description, taken in connection with the accompanying drawing, it is believed that the construction and manner of operation of my improved tire applying or removing tool can be clearly and fully understood. The device is manufactured in the form of a single, one-piece metal casting, preferably of iron, though if desired, the device may be manufactured of steel and nickel plated or otherwise finished. The tool is capable of use in connection with wheels of any diameter and with various rim constructions. In practice, I have found the invention to be extremely serviceable and efficient and to enable the tire to be applied or removed very quickly and with less labor than is the case in the use of the methods and devices heretofore employed.

I have herein described the preferred embodiment of my invention, but it is, of course, apparent that the tool can be constructed in various sizes and other means may be provided in lieu of the foot stirrup 6 for properly holding the article in position. It is, therefore, to be understood that the device is not to be limited to the several specific structural features described, but is susceptible of many minor mechanical variations thereof, and I, therefore, reserve the privilege of adopting all such legitimate changes as may be fairly embodied within the spirit and scope of the invention as claimed.

Having thus fully described my invention, what I desire to claim and secure by Letters Patent is:

1. A tire applying and removing tool consisting of a metal bar having a T-head formed on one end and extending approximately equal distances from the opposite sides of said bar, said head having an obliquely inclined groove in each side face thereof, said grooves being located at the relatively opposite ends of said head and adapted for engagement with a tire rim in applying and removing the tire respectively.

2. A tire applying and removing tool consisting of a metal bar having a T-head formed on one end and extending for approximately equal distances from the opposite sides of said bar, said head having an obliquely inclined groove in each side face thereof, said grooves being located at the relatively opposite ends of said head and adapted for engagement with a tire rim in applying and removing the tire respectively, said head between the grooves therein being formed with a broad flat obliquely inclined face.

3. A tire applying and removing tool consisting of a metal bar having a T-head formed on one end and a foot stirrup on the other end of said bar, said head having side faces obliquely inclined in relatively opposite directions and being provided in each of said inclined faces with a groove, said grooves being located at the relatively opposite ends of the head and adapted for engagement with the tire rim, the side face of the head opposite to one of said grooves being formed to direct a tire to its seat upon the rim and the side face of the head opposite to the other of the grooves being formed to urge the tire outwardly and disengage the same from the rim.

In testimony whereof I hereunto affix my signature in the presence of two witnesses.

WILLIAM C. BOHNE.

Witnesses:
RICHARD R. HANDSCHUH,
HARRY O. SCHUESSELE.